(12) United States Patent
Kaplan et al.

(10) Patent No.: US 9,516,107 B2
(45) Date of Patent: Dec. 6, 2016

(54) SECURE LOCAL SERVER FOR SYNCHRONIZED ONLINE CONTENT MANAGEMENT SYSTEM

(71) Applicant: Dropbox, Inc., San Francisco, CA (US)

(72) Inventors: Josh Kaplan, San Francisco, CA (US); Andrew Bortz, San Francisco, CA (US); David Euresti, San Francisco, CA (US); Sang Tian, San Francisco, CA (US); Alison Kao, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/469,138

(22) Filed: Aug. 26, 2014

(65) Prior Publication Data

US 2015/0358328 A1 Dec. 10, 2015

Related U.S. Application Data

(60) Provisional application No. 62/008,428, filed on Jun. 5, 2014.

(51) Int. Cl.
*H04L 29/00* (2006.01)
*H04L 29/08* (2006.01)
*H04L 29/06* (2006.01)

(52) U.S. Cl.
CPC ........... *H04L 67/1095* (2013.01); *H04L 63/08* (2013.01)

(58) Field of Classification Search
CPC combination set(s) only.
See application file for complete search history.

(56) References Cited

U.S. PATENT DOCUMENTS

2013/0332566 A1\* 12/2013 Oscherov ............. G06F 17/301
709/217
2014/0282985 A1\* 9/2014 Joseph .................... G06F 21/42
726/9

\* cited by examiner

*Primary Examiner* — Ghazal Shehni
(74) *Attorney, Agent, or Firm* — Polsinelli PC

(57) ABSTRACT

Systems, methods, and non-transitory computer-readable storage media for securely accessing locally stored synchronized content using a local web server. A client application on a client device may receive from a web browser on the client device a request to access a local content stored on a client device. The client application may be configured to synchronize the local content with a remote content stored in an online content management system. The client application may issue a challenge for the web browser. The client application or the online content management system may then receive a response to the challenge. If the response is a valid response to the challenge, the web browser may be allowed to access the local content via the client application.

23 Claims, 10 Drawing Sheets

SECURE LOCAL SERVER FOR SYNCHRONIZED ONLINE CONTENT MANAGEMENT SYSTEM

CROSS REFERENCE TO RELATED APPLICATIONS

This claims the benefit of priority to U.S. provisional application No. 62/008,428, filed on Jun. 5, 2014, which is expressly incorporated by reference herein in its entirety.

TECHNICAL FIELD

The present technology pertains to online content management systems, and more specifically pertains to securely accessing synchronized data using a local web server.

BACKGROUND

An online synchronized content management system, such as Dropbox™ from Dropbox Inc. of San Francisco, Calif., allows its users to store and synchronize data on a cloud-based storage and across multiple client devices. Thus, a user may upload a personal folder to the content management system, and then share the folder on multiple user devices by having duplicate copies of the folder on each of the devices. The instances of the shared folder, though may be residing on different devices, can be kept synchronized. In other words, through the process of synchronization, the contents of the shared folder on the server and the multiple client devices can be kept identical. Even the slightest modification made by the user to one of the instances of the folder can automatically be replicated in other instances of the folder in a matter of seconds.

Contents stored in an online content management system can be accessed using either a native client application or a web interface. For example, a user may be able to access files stored in an online content management system using both a client application provided by the service that is installed on the user's device and through a web browser. A user of the web browser can use the web browser to surf the Internet. During or after surfing, the user can decide to use the web browser to access one or more of her content items (e.g., files) stored at the online content management system. Since the browser is already open and in use, the user may find it more convenient to use the browser to access the online data than it would be to switch to a dedicated content navigation application, such as Windows Explorer® on Windows® operating systems or Finder® on Mac® operating systems, to access local data, which is kept synchronized with the remote data in the online content management system. Moreover, the user experience associated with accessing online data using the web browser can vary depending on the speed and/or reliability of the network connection (e.g., Internet speed and/or availability).

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a local web server operable with a native client application, a web browser, and a synchronized online content management system. A client application corresponding to an online content management system can communicate with or include a local web server. The local web server can be used to access and/or interact with data stored locally on a client device through a navigation application such as a web browser. To ensure secure communication between the web browser and the client application, the client application and web browser can complete a challenge-response protocol.

As part of the challenge-response protocol, the client application, possibly through the local web server, can receive from the web browser a request to access a local content stored on the client device. The client application may be configured to synchronize the local content with a remote content stored in the online content management system. The client application may issue a challenge for the web browser. The response to the challenge may then be received. If the response is a valid response to the challenge, then the web browser may be allowed to access the local content via the client application.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
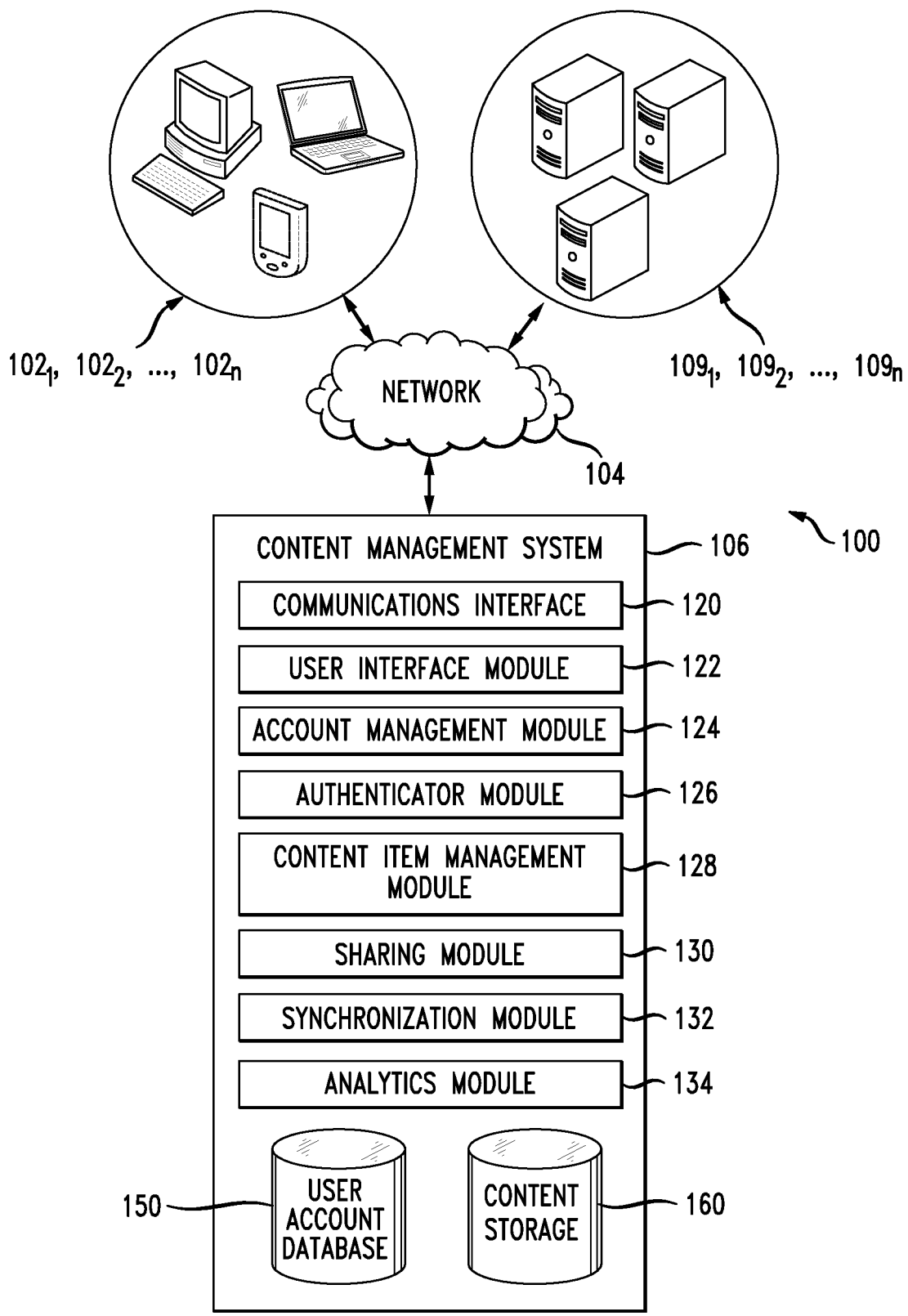
FIG. 1 shows an exemplary content management system configured to communicate with other devices via a network.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for accessing and interacting with local data synchronized with an online content management system using a web browser. The user's client device can be configured to include a local web server. The local server can work in conjunction with the client application or be part of the client application to access and/or interact with the locally stored data, which is synchronized with the online data at the content management system. For example, the client application can include a Secure Socket Layer (SSL) certificate and a private key for a particular uniform resource locator (URL) (e.g., ocms-localhost.com), and can run a hypertext transfer protocol secure (HTTPS) web server bound to a loopback address (e.g., 127.0.0.1). Then the URL can point to the loopback address. Via the local server, a navigation application, such as a web browser, can access and interact with the locally stored data instead of the online data. Since the data is local, network availability and/or Internet speed will not impact performance. However, this approach may have a number of security issues, even when using HTTPS and SSL certificates.

First, because the SSL certificate is distributed with the client application, anyone with access to the client device can also access the certificate. Second, malicious attackers can redirect the ocms-localhost.com URL to a non-loopback Internet Protocol (IP) address in the network outside the client device by, for instance, fraudulently impersonating a domain name server (DNS). Attackers can thus trick legitimate browsers into communicating to the wrong address. Additionally, since such redirection can occur before, during, or after data synchronization, performing an initial verification may not be sufficient on its own. Third, local code running on the client device can masquerade as the client application. Fourth, malicious code locally running on the client device can masquerade as a browser application and attempt to communicate with the client application. Fifth, an attacker can perform a man-in-the-middle attack by intercepting communication between the client application and the browser application. Sixth, an attacker can configure other websites to trigger a request to the client application. Additional security issues may also exist.

To address these security issues, the presently disclosed technology can include a challenge-response protocol to establish a secure communication channel between the web browser and the native client application. In other words, the client application may issue a challenge, such as random bits of data, such that only a legitimate web browser may be able to respond with the valid response to the challenge. By verifying the response to the challenge, the client application may be able to establish a trusting relationship with the web browser. The disclosed technology can enable the user of a client device to use a web browser to securely access data stored locally. The client device can include a client-side application corresponding to an online content management system. The client-side application can communicate with the online content management system to synchronize data stored locally on the client device with data stored on the online content management system. A local web server can be implemented on the client device to work in conjunction with the client-side application, such that the local web server can access the data stored locally. The client device can run a web browser that communicates with the local web server. A user of the client device can use the web browser to connect to the local web server to access the synced data stored locally on the client-side.

Advantages of accessing the data stored locally using the web browser via the local web server may include performance improvements, offline access to the data, and use of native client applications to interact with the data. The online content management system can include a challenge-response protocol that can be carried out by the client-side application and the web browser to ensure that the web browser and the client-side application can securely send sensitive data and take privileged actions on the data.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Online synchronized content management system 106 can support connections from a variety of different client devices, such as desktop computers, mobile computers, mobile communications devices (e.g., mobile phones, smart phones, tablets), smart televisions, set-top boxes, and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. The client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type (e.g. free or paid); usage information (e.g. file edit history); maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Authenticator module 126 may also generate, store, and verify a cryptographic nonce so that a client application and a web browser running on a client device may authenticate each other and establish a secure connection based on a trusted relationship. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

Content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. The content pointer can point to multiple locations, each of which contains a portion of the content item.

In addition to a content path and content pointer, a content entry can also include a user account identifier that identifies the user account that has access to the content item. Multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a URL, which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. The content entry associated with a content item can include a URL flag indicating whether a URL to the content item has been created. For example, the URL flag can be a Boolean value initially set to "0" or "false" to indicate that a URL to the content item has not been created. Sharing module 130 can be configured to change the value of the flag to "1" or "true" after generating a URL to the content item.

Sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to "1" or "true." Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to "1" or "true." A user can thus easily restore access to the content item without the need to generate a new URL.

Figure 2A:
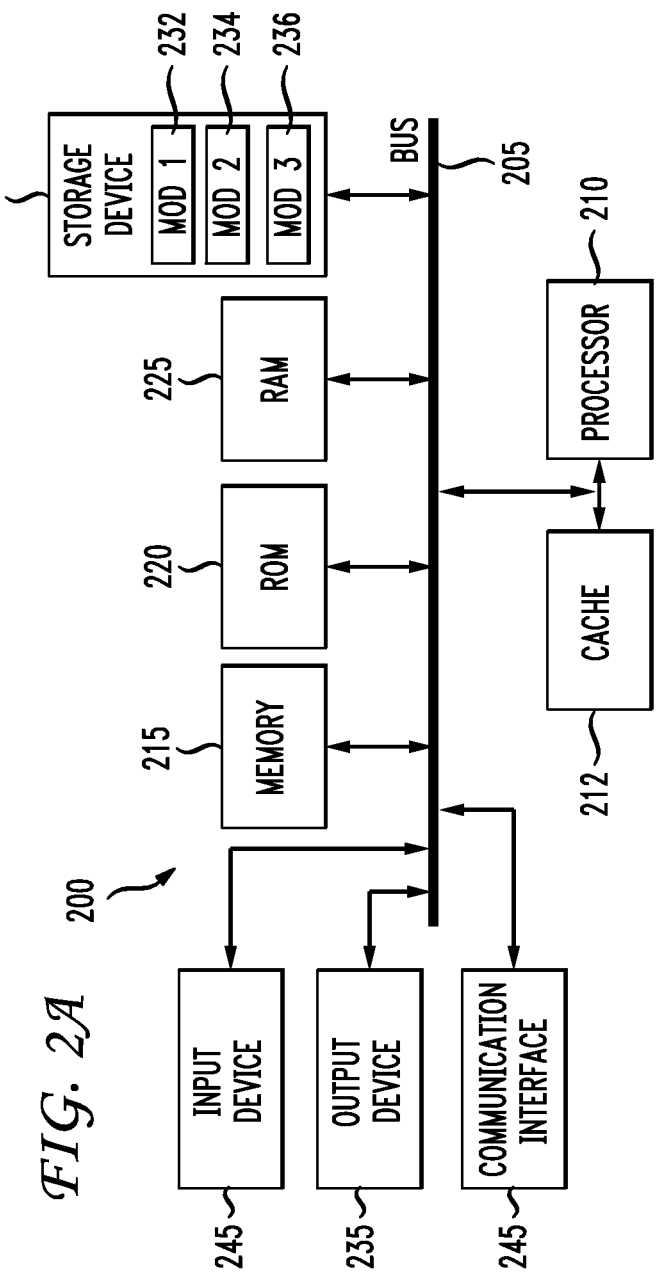
FIG. 2A shows the first exemplary system embodiment for implementing various embodiments of the present technology.
Figure 2B:
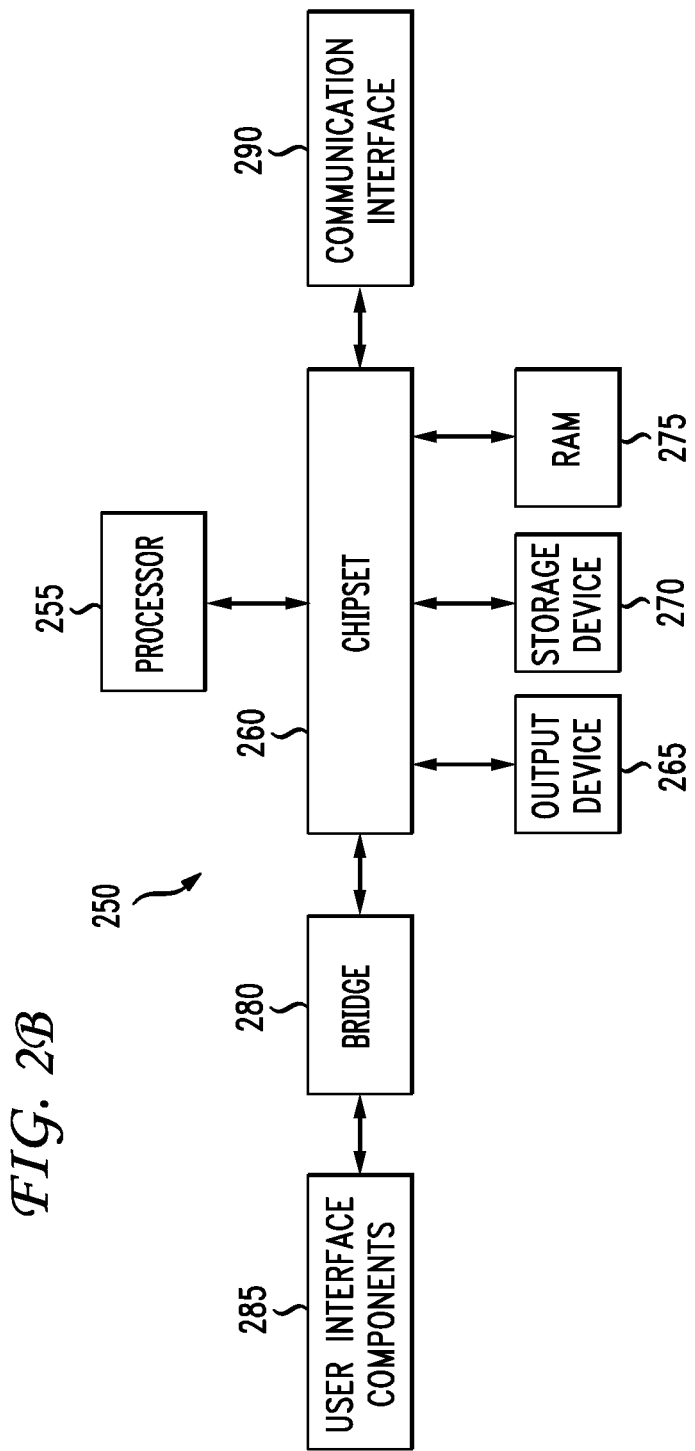
FIG. 2B shows the second exemplary system embodiment for implementing various embodiments of the present technology.

With reference now to FIG. 2A and FIG. 2B, FIG. 2A and FIG. 2B show exemplary possible system embodiments. For example, content management system 106, client devices 102, and/or service providers 109, as shown in FIG. 1, may each be implemented as exemplary system 200 of FIG. 2A or exemplary system 250 of FIG. 2B. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using bus 205. Exemplary system 200 includes a processing unit (CPU or processor) 210 and system bus 205 that couples various system components including system memory 215, such as read only memory (ROM) 220 and random access memory (RAM) 225, to processor 210. System 200 can include a cache of high-speed memory connected directly with, in close proximity to, or integrated as part of processor 210. System 200 can copy data from memory 215 and/or storage device 230 to cache 212 for quick access by processor 210. In this way, the cache can provide a performance boost that avoids processor 210 delays while waiting for data. These and other modules can control or be configured to control processor 210 to perform various actions. Other system memory 215 may be available for use as well. Memory 215 can include multiple different types of memory with different performance characteristics. Processor 210 can include any general purpose processor and a hardware module or software module, such as module 1 (232), module 2 (234), and module 3 (236) stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

To enable user interaction with computing device 200, input device 245 can represent any number of input mechanisms, such as a microphone for speech, a touch-sensitive screen for gesture or graphical input, keyboard, mouse, motion input, speech and so forth. Output device 235 can also be one or more of a number of output mechanisms known to those of skill in the art. In some instances, multimodal systems can enable a user to provide multiple types of input to communicate with computing device 200. Communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

Storage device 230 can include software modules 232, 234, 236 for controlling processor 210. Other hardware or software modules are contemplated. The storage device 230 can be connected to system bus 205. In one aspect, a hardware module that performs a particular function can include the software component stored in a computer-readable medium in connection with the necessary hardware components, such as processor 210, bus 205, display 235, and so forth, to carry out the function.

FIG. 2B illustrates computer system 250 having a chipset architecture that can be used in executing the described method and generating and displaying a graphical user interface (GUI). Computer system 250 is an example of computer hardware, software, and firmware that can be used to implement the disclosed technology. System 250 can include processor 255, representative of any number of physically and/or logically distinct resources capable of executing software, firmware, and hardware configured to perform identified computations. Processor 255 can communicate with chipset 260 that can control input to and output from processor 255. In this example, chipset 260 outputs information to output 265, such as a display, and can read and write information to storage device 270, which can include magnetic media, and solid-state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

While content management system 106 is presented with specific components, it should be understood by one skilled in the art, that the architectural configuration of system 106 is simply one possible configuration and that other configurations with more or less components are also possible.

Figure 3:
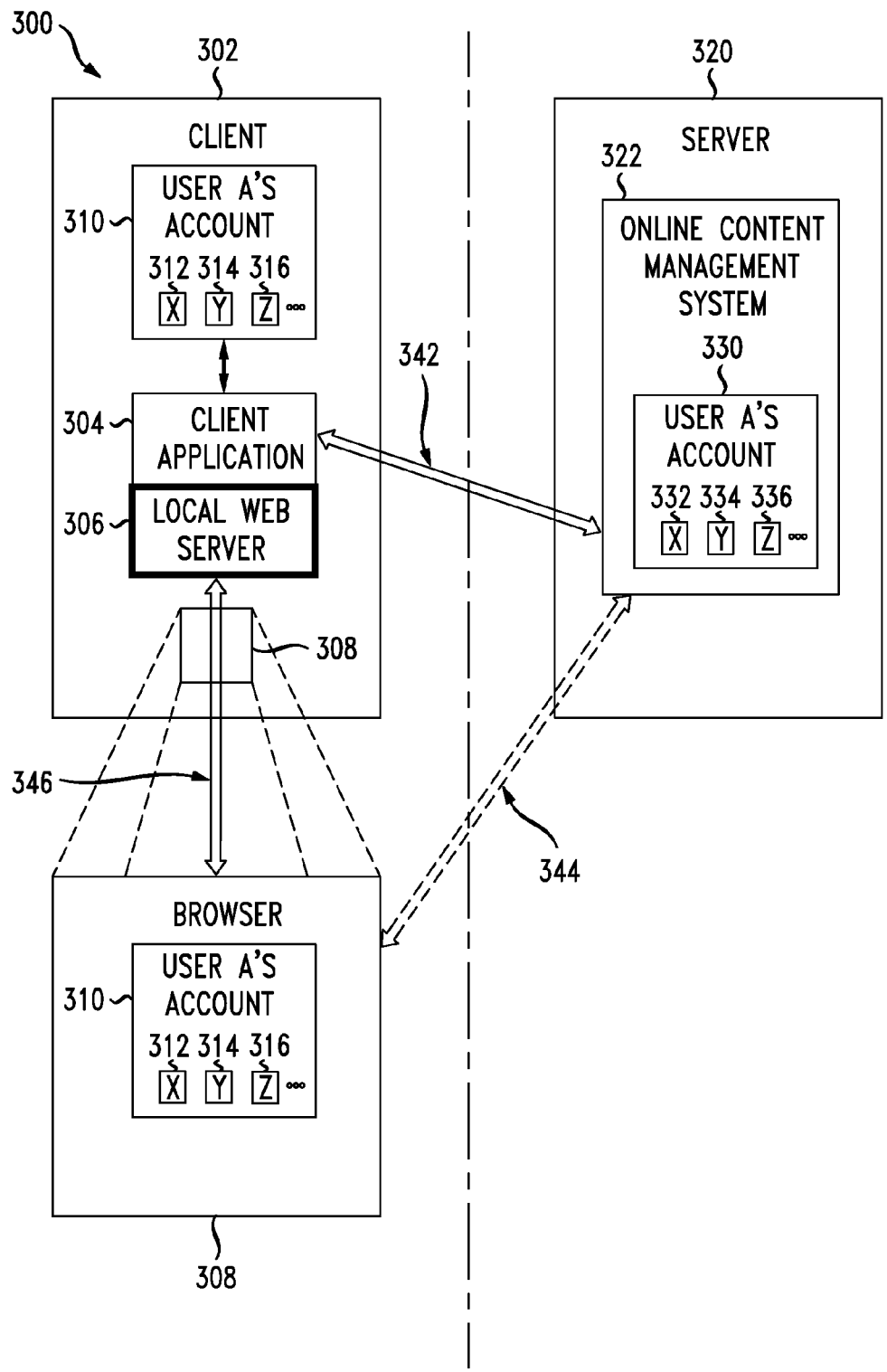
FIG. 3 shows an exemplary local web server that is compatible with a synchronized online content management system.

FIG. 3 shows an exemplary local web server that is compatible with a synchronized online content management system. Exemplary system 300 can include client computing device 302 (i.e., client device, client, etc.) and one or more servers 320 external to client computing device 302. Client device 302 can be running client-side application 304 (i.e., client application). Client device 302 can also be running local web server 306. Local web server 306 can be included with or can work in conjunction with client application 304. Moreover, client computing device 302 can be running a navigation application, such as web browser 308.

Client application 304 can be configured to communicate with online content management system 322 that is running on one or more servers 320. Client application 304 can communicate with content management system 322 over a network, such as the Internet. Client application 304 can communicate with content management system 322 to synchronize data stored locally (i.e., local data, local contents, local files, etc.) on client device 302 with data (i.e., online data, remote contents, etc.) stored at content management system 322. For example, particular pieces or portions of data stored locally on client 302 can be synchronized with respective pieces or portions of data stored at content management system 322. Accordingly, content items (e.g., files) and/or other information can be stored and synchronized at both content management system 322 and client device 302. The synchronization between the data stored locally on client 302 and the data stored at content management system 322 can occur at one or more specified times, such as at a specified time on a daily basis or at a time specified by a synchronization policy (e.g., whenever a threshold percentage of data has been modified).

Online content management system 322 can store data associated with users or other entities. For example, online content management system 322 can be configured to include accounts for multiple users, each respective user account storing data for a respective user (e.g., User A). User A's account 330 with online content management system 322 can include data such as content item X 332 (e.g., file X), content item Y 334, content item Z 336, and so forth.

User A can run client-side application 304 that is compatible with online content management system 322. Client application 304 can be configured to communicate 342 with content management system 322. Via communication 342, client application 304 can synchronize local data associated with User A's local account 310 and data stored under User A's account 330 at content management system 322. For example, local content items (e.g., files) X 312, Y 314, and Z 316 can be synchronized, respectively, with content item X 332, content item Y 334, and content item Z 336 stored at content management system 322. User A's local account 310 can be a directory on client device 302. Content items, files, and/or other data placed in the directory for User A's local account 310 on client 302 can be synchronized with data included in User A's account 330 on content management system 322.

As shown in FIG. 3, client application 304 can interact with data stored locally (e.g., content item X 312, content item Y 314, content item Z 316, etc.) under User A's account 310. Local web server 306 can also interact with the data stored locally, such as by interacting with the local data via client application 304.

Browser 308 can access local web server 306 to interact with the data stored locally (e.g., content item X 312, content item Y 314, content item Z 316, etc.). Browser 308 can function as a navigational tool to view, read, browse, or otherwise interact with the local data (e.g., content item X 312, content item Y 314, content item Z 316, etc.). As shown in FIG. 3, through communication 346, browser 308 can access local web server 306 to interact with the local data.

Accessing data (e.g., 332, 334, 336) at content management system 322 via connection 344 can serve as a backup or alternative to accessing the local data (e.g., 312, 314, 316) via local web server 306 and connection 346. Accessing the locally stored data (synchronized with the data at content management system 322) via local web server 306 can offer several advantages over using the connection 344 (e.g., Internet connection) to access the data at content management system 322. These advantages can include, but are not limited to, improved performance, offline access to data, and the ability to utilize native applications for interacting with certain data.

As discussed above, one advantage of accessing synchronized local data via local web server 306 is improved performance. Improved performance can include faster interaction and/or operation with the local data. For example, the speed of opening content item 314 can be significantly increased when content item 314 is opened from browser 308 via local web server 306 and client application 304, as compared to opening content item 334 (synchronized with content item 314) from browser 308 via web connection 344. Content item 314 (as well as synchronized content item 334) can be an image file. Locally opening a full resolution version of image content item 314 via local web server 306 can be significantly faster than opening image content item 334 from online content management system 322. Local connections (e.g., 346) can have significantly less latency issues than other network connections (e.g., 342, 344).

In another example, improved performance can include generating previews for data. Content items 312, 314, and 316 can be image files. As such, thumbnails can be generated for image files 312, 314, and 316. The generating and displaying of the previews (e.g., thumbnails) can be performed more efficiently on client device 302 as compared to generating previews at online content management system 322 and then transmitting the previews from content management system 322 to client 302 for display. The generating of the thumbnails for local data can be performed using computing resources of client computing device 302.

As discussed above, another advantage of accessing local data is that a user can still have access to the data when there is no network connection (e.g., 342, 344) to content management system 322. In other words, accessing data (e.g., 332, 334, 336) stored at content management system 322 can only occur when client 302 can connect to content management system 322. An advantage of accessing local data is that the data can still be accessed when the Internet is unavailable or disabled (e.g., 342, 344). In one example, a user can board an airplane that does not provide wireless Internet connectivity. During the flight, the user can decide to read a document (e.g., 312 on client 302, 332 on content management system 322). Using browser 308 to access local web server 306, the user can read the document (e.g., 312 on client 302) even though there is no Internet available during the flight.

In another example, the user can be listening to a music file that is synchronized on client 302 as file 316 and on content management system 322 as file 336. If the user plays file 336 on content management system 322 via browser 308, and if the connection between browser 108 and content management system 322 is lost 344, then the playing of file 336 can be interrupted. In contrast, if the user plays local file 316 on browser 308 via local web server 306, then the playing of file 316 can continue even if there is no connection (e.g., 342, 344) to content management system 322.

Figure 4:
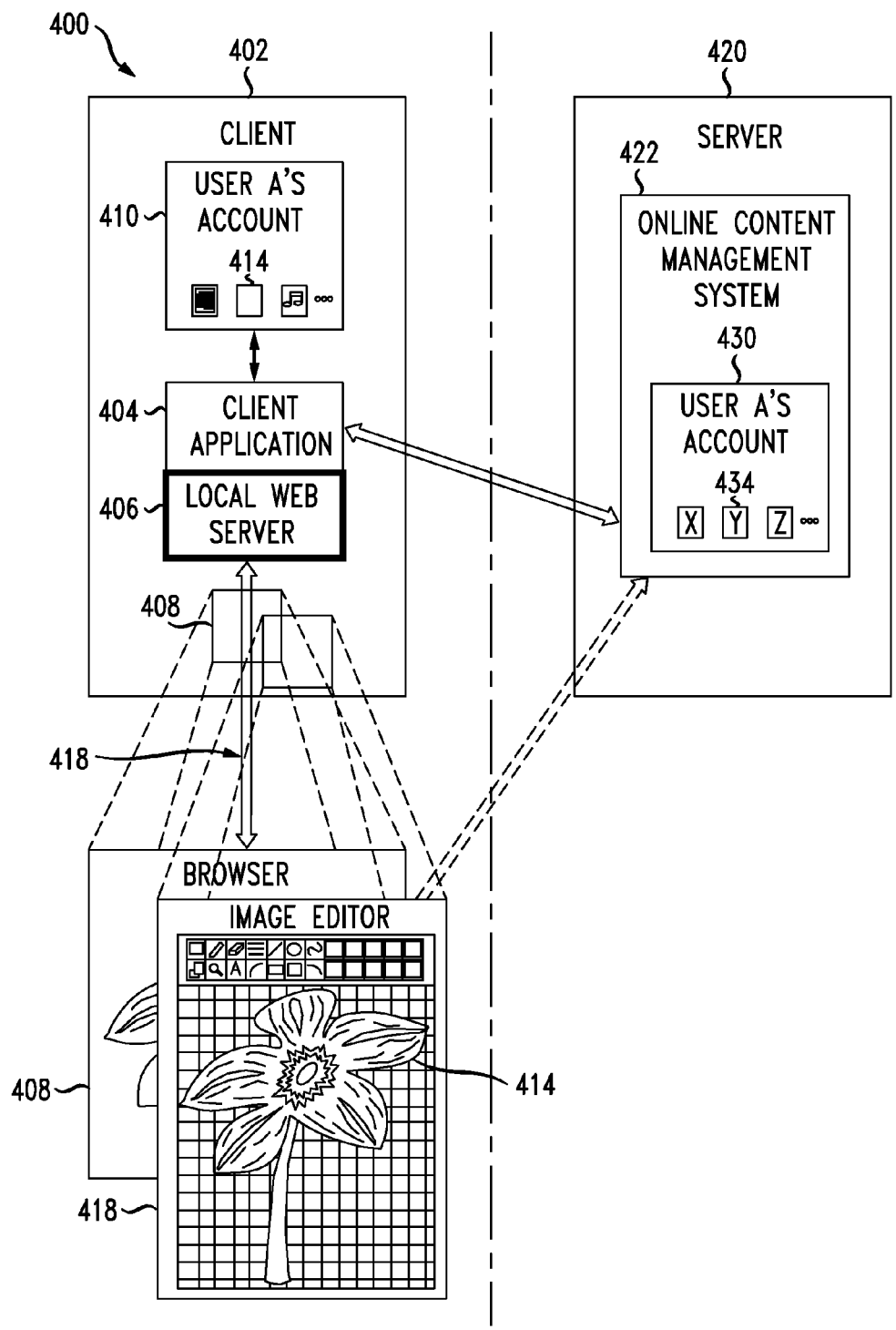
FIG. 4 shows an exemplary embodiment for accessing local data using a local web server to execute an application configured to operate with the local data.

FIG. 4 shows an exemplary system embodiment for accessing data using a local web server to execute an application (i.e., native application) configured to operate with the data. A native application may be an application that can run directly on the device's operating system without having to rely on another application such as a web browser and be able to access the resources of the device or the operating system directly. Typically, web applications cannot communicate with device operating systems. Accordingly, opening a content item, such as a file (e.g., 434), at online content management system 422 is typically limited to only using certain web applications to open the content item, rather than using native applications to open the content item. For example, opening image file 434 at content management system 422 using browser 408 can be limited to executing an image viewer included with or embedded in browser 408 to open image file 434.

In exemplary system embodiment 400, local web server 406 and client application 404 are implemented on client device 402 such that local web server 406 and/or client application 404 can communicate with the operating system of client 402. It follows that browser 408 can access local web server 406 and/or client application 404 to communicate with the operating system of client 402. Local web server 406 and/or client application 404 can ask the operating system which applications are native to a particular piece of data. As such, another advantage of locally accessing synchronized data is that the data can be interacted with and/or manipulated using native applications or applications that are configured to be operated with the data.

In one example, browser 408 can navigate to image file 414 via local web server 406. From browser 408, an instruction can be sent via local web server 406 to select which native application to use to open image 414 (e.g., an option to "Open With . . . " with respect to file 414). The instruction can correspond, for example, to a right click of a mouse with respect to an icon representing file 414. Image editor 418 can be included among those native applications installed on client 402. A command initiated from browser 408 can cause image editor 418 (i.e., native application, application configured particularly for file 414 or for a file type associated with file 414) to open file 414. Opening image file 414 using image editor 418 can provide a richer or otherwise better experience than compared to opening image 434 at content management system 422 with a simpler web image viewer application.

Figure 5:
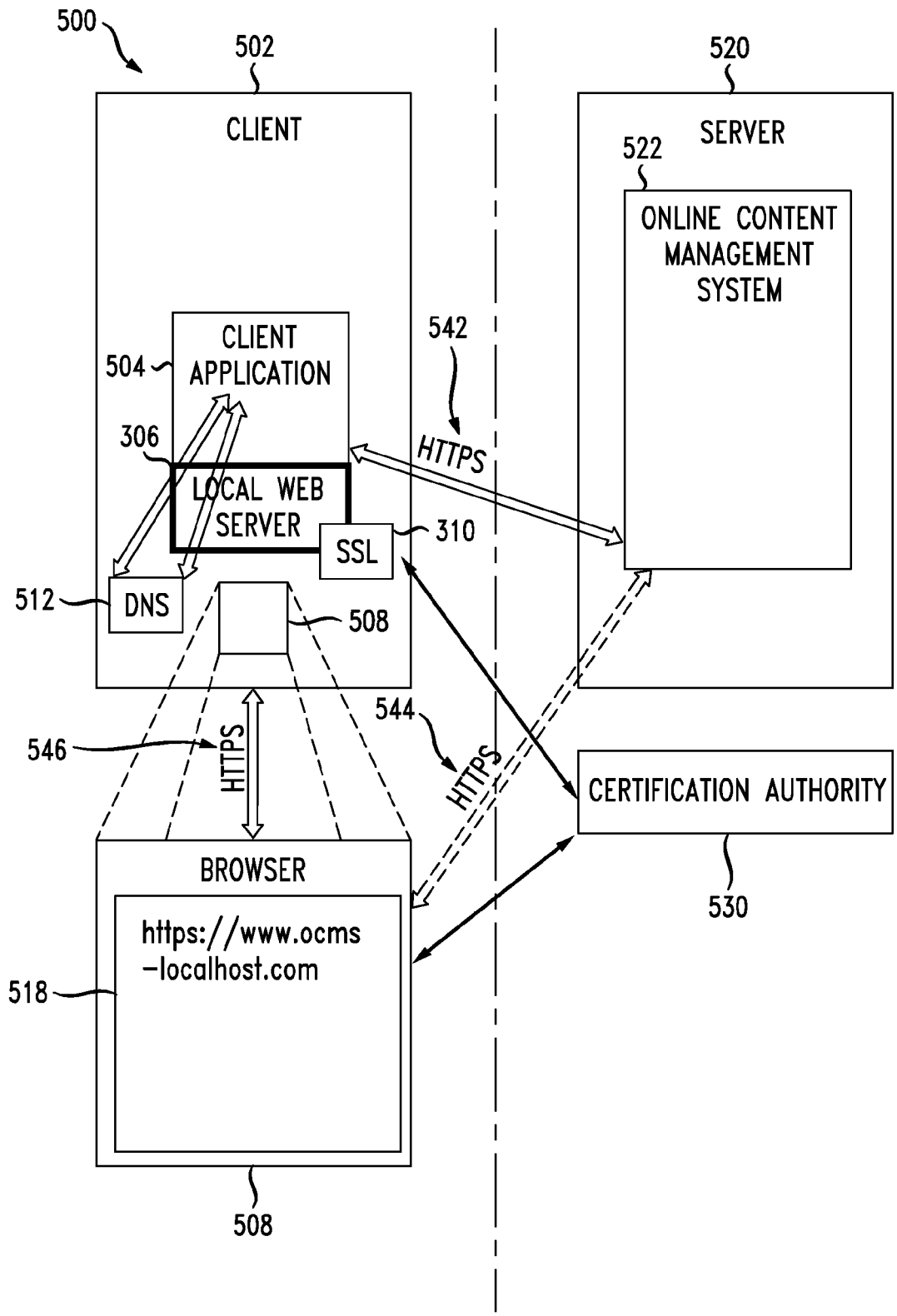
FIG. 5 shows an exemplary embodiment for securely communicating among a client application having a local web server, a web browser, and a synchronized online content management system.

FIG. 5 shows an exemplary embodiment for securely communicating among a client application having a local web server, a web browser, and a synchronized online content management system. Communications among local web server 506, browser 508, and content management system 522 can correspond, for example, to HTTPS connections 542, 544, 546, as shown in exemplary system embodiment 500. However, due to the HTTPS scheme, browser 508 may not be able to access local web server 506 by going to target address "https://localhost" because the HTTPS scheme can require a security key, such as an SSL certificate.

A domain name for online content management system 522 can be created, such as "https://www.ocms-localhost.com" 518. In order for local web server 508 to accept HTTPS connections, there must be a public key certificate for local web server 508. The certificate must be signed by a trusted certificate authority 530 in order for browser 508 to accept the certificate without warning. Certificate authority 530 can certify or verify that the certificate holder (e.g., domain 518) is indeed the operator of the web server (e.g., local web server 508) that presents the certificate.

In FIG. 5, local web server 506 can be set up with SSL certificate 510, which can be prepared, for example, by an administrator of content management system 522. SSL certificate 510 can be verifiable with certificate authority 530. In one example, in order to access local web server 506, browser 508 can go to domain "https://www.ocms-localhost.com" 518 (which can also be prepared or set up by an administrator of content management system 522). Domain name "https://www.ocms-localhost.com" 518 can be configured to resolve to the loopback IP address (e.g., 127.0.0.1), which points back to client device 502, and more specifically to local web server 506. Browser 508 can verify with certificate authority 530 that SSL certificate 510 of local web server 506 is valid. Then HTTPS connection 546 can be established such that browser 508 can access local web server 506 via domain name "https://www.ocms-localhost.com" 518.

An entry for domain name 518 can be stored in local domain name service (DNS) 512. This can allow browser 508 to resolve domain name 518 to the loopback IP address, such as 127.0.0.1, even when there is no Internet connection. In one example, the entry for domain name 518 can be configured to have a long time to live (TTL) to further ensure or increase the likelihood that browser 508 will be able to resolve domain name 518 to the loopback IP address.

Figure 6:
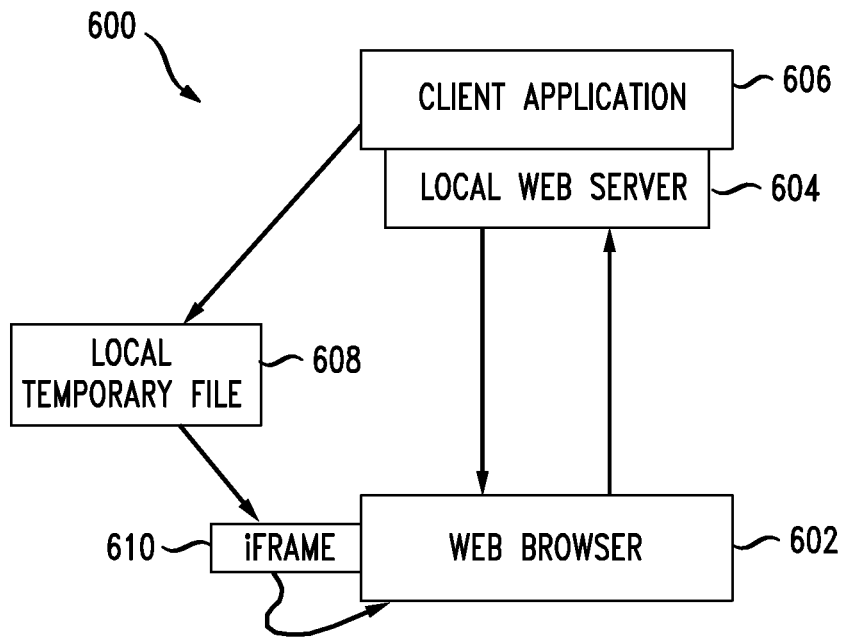
FIG. 6 shows an exemplary overview of a challenge-response protocol for securely communicating between a client application having a local web server and a web browser.

FIG. 6 shows an exemplary overview of a challenge-response protocol for securely communicating between a client application having a local web server and a web browser. Initially, web browser 602 can establish a connection with client application 606 via local web server 604. Local web server 604 can be part of client application 606. In some cases, web browser 602 can establish a WebSocket connection with client application 606. For example, web browser 602 can connect to an exemplary domain https://www.ocms.com that corresponds to an online content management system. Client-side scripts, such as JavaScript instructions, downloaded from the online content management system (e.g., www.ocms.com) can make a WebSocket connection to the URL associated with local web server 604, such as https://www.ocms-localhost.com, on a preconfigured port (e.g., https://www.ocms-localhost.com:12345). One of ordinary skill in the art will readily recognize that local web server 604 can be provided with a different URL than https://www.ocms-localhost.com. However, the URL given to local web server 604 may have to be distinct from the URL for the online content management system so that web browser 602 may choose to direct its traffic to either local web server 604 or the online content management system by selecting the appropriate URL.

In some cases, web browser 602 can establish a connection with client application 606 using a connection other than WebSockets, such as utilizing a proxy via an online content management system server (e.g., www.ocms.com) or using doubly encrypted HTTPS traffic. For example, both web browser 602 and client application 606 can send challenge data to www.ocms.com. The challenge data can then be used as a secure identifier for the connection and www.ocms.com can relay any messages. In another example, the protocol can include a lightweight, replay-protected authenticated encryption channel on top of HTTPS, using the challenge data as a session key. Then web browser 602 can send encrypted messages directly to client application 606.

After web browser 602 establishes a connection with client application 606, client application 606 can create local temporary file 608 that may include a nonce or other challenge data. A nonce can be a randomly generated number or bit string that is used only once in a cryptographic communication. Client application 606 can store local file 608 in storage on the client device where it is accessible only to the authenticated local user and/or locally run applications. Additionally, client application 606 can generate a URL associated with local file 608. After creating local file 608 and the URL to local file 608, client application 604 can respond to web browser 602 with the URL.

In some cases, client application 606 can split the challenge data into multiple parts, such as through a secret sharing algorithm. In this case, client application 606 can embed a part of the challenge data in the generated URL and client application 606 can generate one or more local files containing the remaining parts. Additionally, the local files can contain web browser executable instructions, such as JavaScript instructions. Client application 606 can generate the URL such that when web browser 602 executes the URL, web browser 602 may be directed to local file 608. Web browser application 602 can then execute the instructions contained in the local file in order to re-create the challenge data. For example, the file can contain JavaScript instructions that recombine the parts. Web browser 602 may then use the re-created challenge data as part of its response data.

Prior to or after creating local file 608, client application 606 can perform one or more security verifications or sanity tests, such as ensuring that the connection from web browser 604 is associated with the correct local user; the URL associated with local web server 604 (e.g., https://www.ocms-localhost.com) resolves to an appropriate loopback address such as 127.0.0.1; no unauthorized processes are running on the client device and the processes are listening only on appropriate ports; the web browser is one of the white-listed (i.e., pre-approved) browsers; the web browser is running under the same operating system user account as the client application; the origin header of the request is from the online content management system; etc.

Other security measures can be implemented. For example, in a dual-account environment where the client application may handle more than one content management user account at a given time on a single client device, after a web browser requests to the desktop client application for data access for user account A, the client application can check whether it is running as the user account A. The client application can spawn separate processes for different user accounts (e.g., the first process handles user account A and the second process handles user account B). The client application may determine whether at least one of the multiple processes is currently running under the user account A. In other words, if a client process is currently running as user account A, then the client application may proceed as normal. Likewise, the client application may check whether there is a paired account linked, which may run as a separate process, and determine whether that other process is running as user account A. If the other process is running as user account A, then the client application may proceed as normal. However, if neither of the client processes is running as user account A, then the client application can close the connection with the web browser and deny the web browser access to the local content.

Web browser 602 can receive the URL from client application 606 and use the URL to read local file 608. For example, JavaScript instructions on www.ocms.com can validate the URL and load the location of local file 608. Web browser 602 can then call the JavaScript postMessage method to transfer the challenge data from local file 608 to web browser 602.

In some cases, web browser 602 can load local file 608 into HTML iframe 610. iframe 610 can call the JavaScript postMessage method to send the challenge data to the opening frame. The opening frame can then forward the challenge data to client application 606 and then immediately close. iframe 610 can be an invisible iframe. Alternatively, web browser 602 can read in local file 608 into a pop-up window. The pop-up window can call the JavaScript postMessage method to send the challenge data to client application 606 and then immediately close.

Once client application 606 receives response data from web browser 602 (i.e., the challenge data retrieved from local file 608 by web browser 602), client application 606 can determine whether the response data is valid (i.e., the response data corresponds to the challenge data). If client application 606 determines that the response data is valid, client application 606 can certify that the challenge-response protocol has been satisfied for the established connection. Future communication between web browser 602 and client application 606 over the established connection can be considered secure. That is, both sides of the communication channel are communicating with an authorized endpoint. Therefore, web browser 602 and client application 606 can send sensitive data and take privileged actions on the data.

As described above, a user can have an account with the content management system. In some cases, to access the account the user can provide user credentials. For example, when the user navigates to the exemplary URL for the online content management system, www.ocms.com, using a web browser, the user may be presented with a login page where the user enters a username and password. Likewise, the user may be required to provide user credentials so that a native client application can access the user's account on the content management system.

In some cases, the user may not be simultaneously logged into both the native client application and www.ocms.com. However, to access local content using the web browser, it may be necessary for the user to be logged into both. When the user is logged into either the client application or to the online content management system via a web browser (e.g., www.ocms.com), the known login credentials can be used to authenticate the user on the other. For example, if the user is logged in on the client application, the login credentials from the client application can be used to authenticate the user on www.ocms.com. This can occur prior to, during, or after completing the challenge-response protocol.

Figure 7:
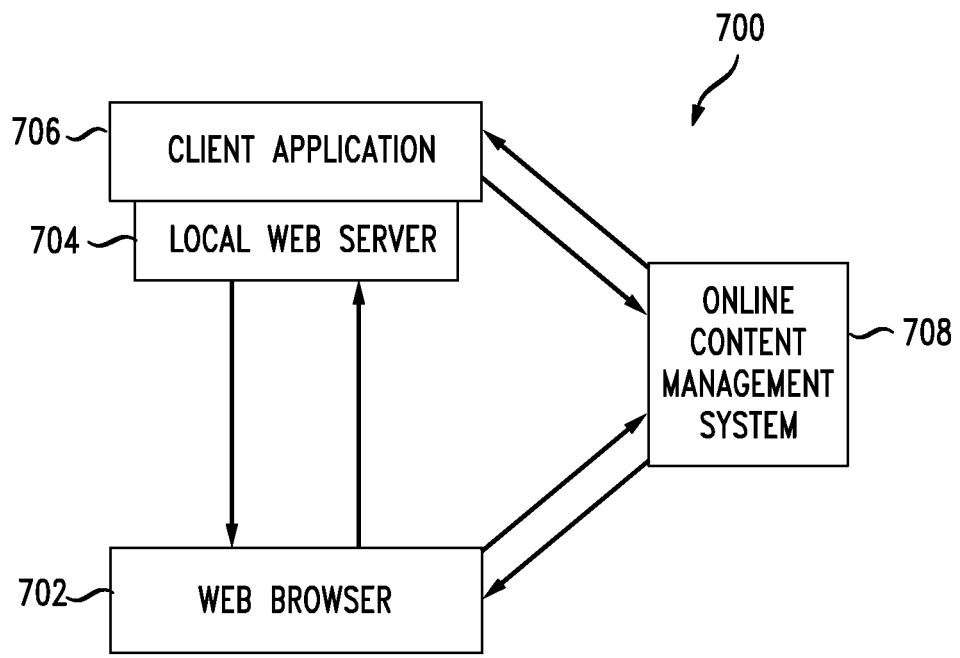
FIG. 7 shows an exemplary overview of another challenge-response protocol for securely communicating among a client application having a local web server, a web browser, and a synchronized online content management system.

FIG. 7 shows an exemplary overview of another challenge-response protocol for securely communicating among a client application having a local web server, a web browser, and a synchronized online content management system. In this exemplary challenge-response protocol 700, online content management system 708 may function as a proxy to authenticate both client application 706 and web browser 702 as authorized endpoints. Prior to engaging in challenge-response protocol 700, the user may have already established a secure connection between client application 706 and online content management system 708 by, for instance, providing the user's credentials (i.e., username and password). The user may have also established a secure connection between web browser 702 and online content management system 708 by, for example, similarly providing the user credentials at www.ocms.com. Thus, in this example, now online content management system 708 has established trusting relationships with both client application 706 and web browser 702. However, this, in and of itself, may not guarantee that any connections between client application 706 and web browser 702 may be secure (i.e., client application 706 cannot yet trust web browser 702 and vice versa).

When a communication channel (e.g., WebSocket) is established between web browser 702 and client application 706, client application 706 and web browser 702 can engage in challenge-response protocol 700 by using online content management system 708 as a proxy. In order to verify that communication between client application 706 and web browser 702 is secure, client application 706 may first send a signal to online content management system 708 to request an issuance of challenge data. The challenge data can be a randomly generated string of data such as a cryptographic nonce. In response to the request, online content management system 708 can generate such challenge data (e.g., nonce) and send the challenge data back to client application 706. In the alternative, instead of requesting to online content management system 708 to issue the challenge data, client application 706 itself can generate the challenge data and notify online content management system 708 of the challenge data that has been generated. Either way, online content management system 708 can store the challenge data (generated by either online content management system 708 or client application 706) in storage so that it can be retrieved later for comparison with the response data provided by web browser 702, as will be discussed below.

Once the challenge data is generated and online content management system 708 obtains a copy of the challenge data, client application 706, possibly via local web server 704, can send the challenge data to web browser 702. After web browser 702 receives the challenge data, it creates response data based on the challenge data. In some cases, the response data created by web browser 702 may be identical to the challenge data. In other cases, the response data may include additional information. Web browser 702 can now forward the response to online content management system 708 for verification.

Online content management system 708 may receive the response data from web browser 702 and verify its validity by comparing it with the challenge data that online content management system 708 has previously stored (i.e., either by generating the challenge data or receiving the challenge data from client application 706). For example, if the challenge data was a nonce, then online content management system 708 can determine whether the previously generated nonce value matches the nonce value received from web browser 702. If it is determined by online content management system 708 that the response data is the valid response to the challenge data, then online content management system 708 can notify web browser 702 and/or client application 706 that the challenge-response protocol is satisfied, thereby assuring that the connection between web browser 702 and local web server 704 (and, by extension, client application 706) is secure. If online content management system 708 determines that the response data does not correspond to the challenge data, it can similarly notify the negative result to web browser 702 and/or client application 706.

Although the exemplary challenge-response protocol illustrated above depicts client application 706 as issuing the challenge to web browser 702, one of ordinary skill in the art will understand that other embodiments where the challenge is issued by web browser 702 to client application 706 are also possible. For example, web browser 702 may initiate the validation process by requesting to online content management system 708 to generate the challenge data such as a nonce. Alternatively, web browser 702 itself may create the challenge data and transmit the challenge data to online content management system 708 for safekeeping. Web browser 702 may then issue the challenge to client application 706, which forwards the received data to online content management system 708 as the response data for verification. Subsequently, online content management system 708 can compare the previously generated challenge data with the response data received from client application 706 to determine whether the connection between client application 706 and web browser 702 is a secure one. Online content management system 708 can transmit the result to client application 706 and/or web browser 702.

Figure 8:
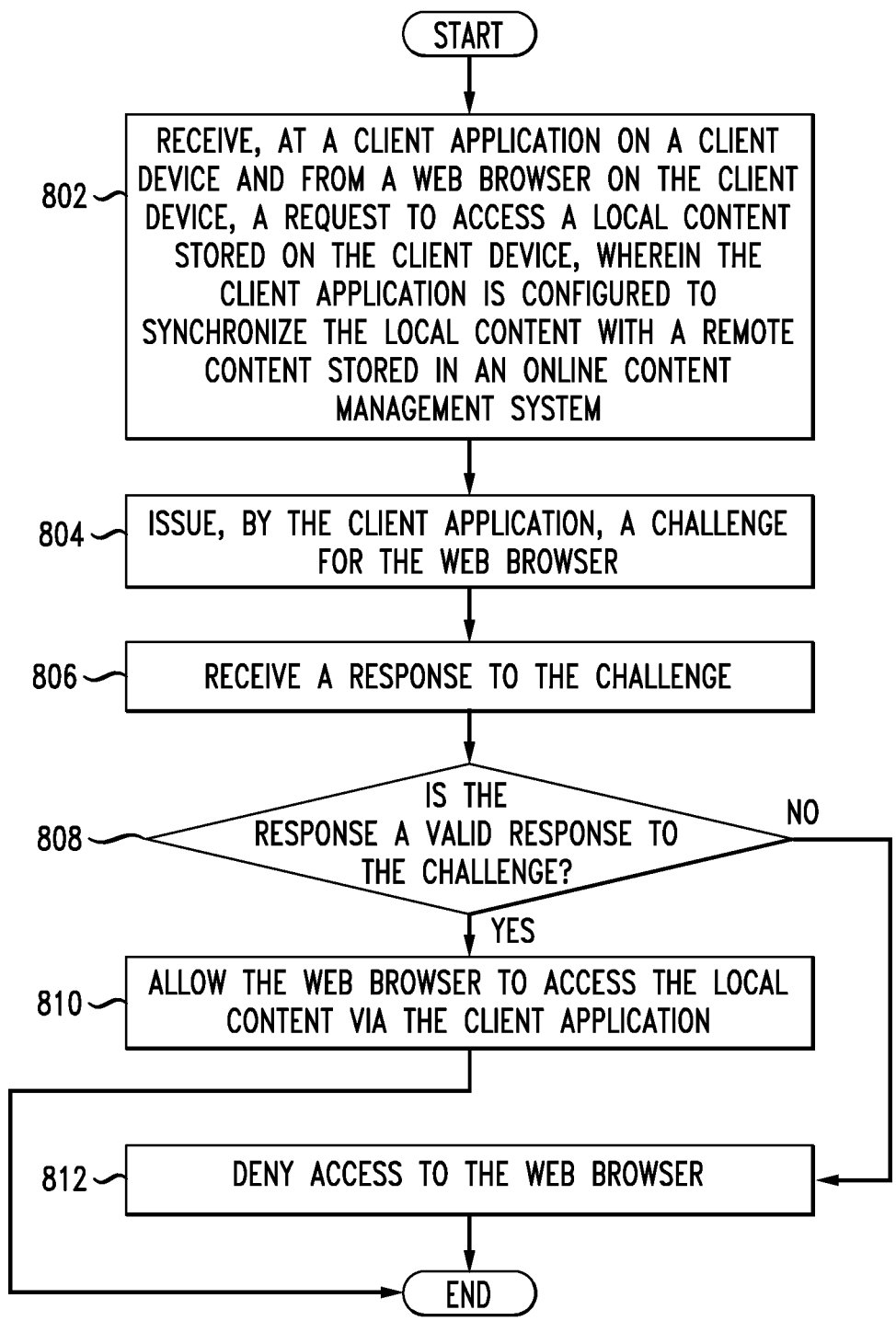
FIG. 8 shows an exemplary method embodiment.
Figure 9:
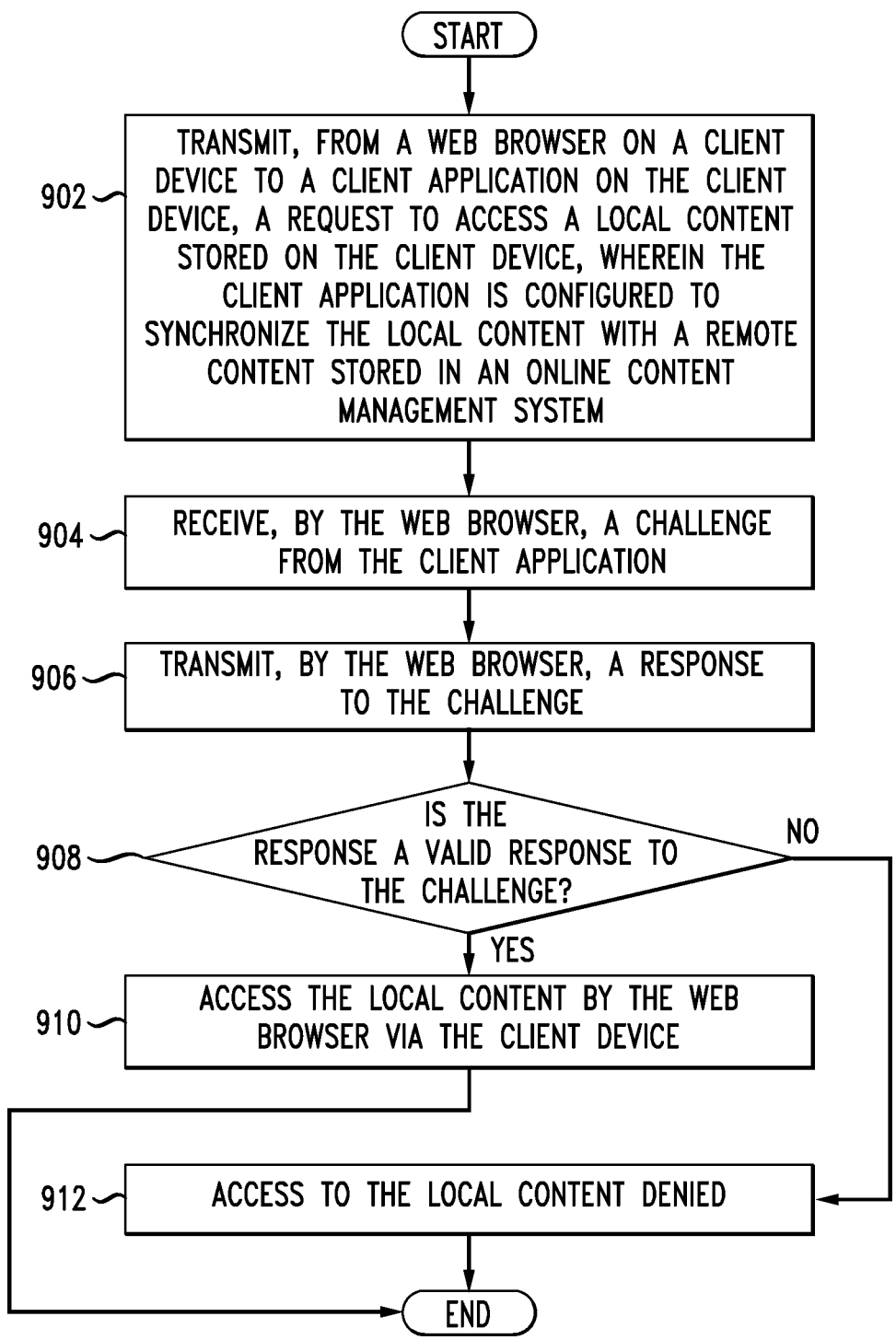
FIG. 9 shows another exemplary method embodiment.
Figure 10:
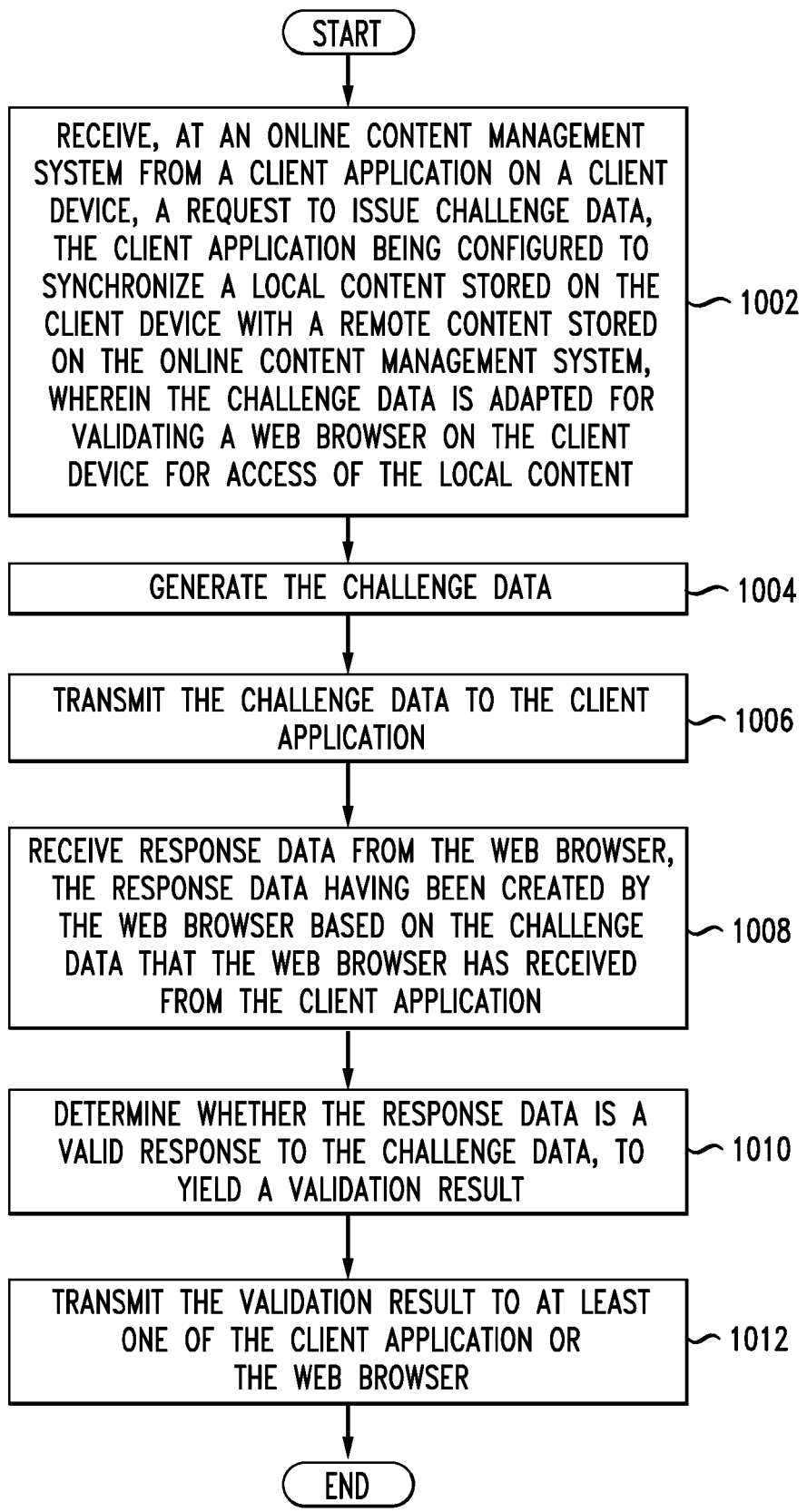
FIG. 10 shows yet another exemplary method embodiment.

Having disclosed some basic system components and concepts, the disclosure now turns to the example method embodiments shown in FIGS. 8-10. For the sake of clarity, the methods are described in terms of system 200, as shown in FIG. 2A, configured to practice the method. Alternatively, the methods can be practiced by client device 102$_i$, service provider 109$_j$, or online content management system 106, as shown in FIG. 1; system 250 as shown in FIG. 2B; or client application 304, local web server 306, or web browser 308, as shown in FIG. 3. The steps outlined herein are exemplary and can be implemented in any combination thereof in any order, including combinations that exclude, add, or modify certain steps.

FIG. 8 shows an exemplary method embodiment. The exemplary method embodiment shown in FIG. 8 may be practiced by, for example, a client application running on a client device. System 200 may receive, at a client application on a client device and from a web browser on the client device, a request to access a local content stored on the client device, wherein the client application is configured to synchronize the local content with a remote content stored in an online content management system (802). The client application may have a local web server, and the local web server may receive the request that is addressed to a loopback address of the client device (e.g., 127.0.0.1). The local web server can be part of the client application or a separate hardware and/or software module. Receiving the request can be accomplished by establishing a web socket connection between the client application and the web browser. Prior to issuing a challenge, system 200 may perform various security verification measures such as validating that the request comes from a correct local user, validating that an address associated with the client application resolves to a loopback address for the client device (e.g., 127.0.0.1), and monitoring a specific communicational channel, such as a specific port number that is known to be vulnerable, so that no unauthorized application is listening in on the vulnerable port. For example, system 200 can check to make sure that no unauthorized user is listening on port 843, which could potentially be abused by an attacker by using Adobe Flash® application or Microsoft Silverlight® application.

System 200 may issue, by the client application, a challenge for the web browser (804). Issuing the challenge may entail creating challenge data on the client device, and receiving the response may be accomplished by receiving, by the client application, response data created by the web browser based on the challenge data. The challenge data and/or the response data can be a cryptographic nonce. The challenge data may be created by the client application and stored at a location, on the client device, that is accessible only to applications that are running locally on the client device in order to prevent unauthorized users or devices from storing creating and storing counterfeit challenge data. Issuing the challenge can be also done by creating and storing a file on the client device. The file may contain the challenge data and instructions for creating the response data based on the challenge data. Issuing the challenge may also include transmitting by the client application to the web browser a location identifier that identifies a location of the challenge data on the client device. Data traffic between the client application and the web browser can be doubly encrypted. Issuing the challenge can also be accomplished by receiving the challenge data from the online content management system and forwarding the challenge data to the web browser.

System 200 may receive a response to the challenge (806). The response data may have been transmitted by the web browser to the client application via a JavaScript postMessage method, a hypertext markup language iframe, and/or a pop-up window. Receiving the response may include receiving from the online content management system a validation of the response data that had been created by the web browser based on the challenge data and sent by the web browser to the online content management system. System 200 may determine whether the response is a valid response to the challenge (808). When the response is a valid response to the challenge, system 200 may allow the web browser to access the local content via the client application (810). Otherwise, system 200 may deny access to the web browser (812).

FIG. 9 shows another exemplary method embodiment. This exemplary method embodiment may be practiced by, for example, a web browser running on a client device. System 200 may transmit, from a web browser on the client device to a client application on the client device, a request to access a local content stored on the client device, wherein the client application is configured to synchronize the local content with a remote content stored in an online content management system (902). System 200 may receive, by the web browser, a challenge from the client application (904). Receiving the challenge can include receiving, by the web browser, a location identifier for challenge data, which has been created by the client application at a location on the client device. The location may be accessible only to applications that are locally running on the client device. The web browser can then access the challenge data using the location identifier. Alternatively, receiving the challenge may include receiving, by the web browser, challenge data from the client application, wherein the challenge data is also sent by the client application to the online content management system.

System 200 may transmit, by the web browser, a response to the challenge (906). Transmitting the response can include creating response data by the web browser based on the challenge data and transmitting the response data by the web browser to the client application. Alternatively, transmitting the response can include creating, by the web browser, response data based on the challenge data and transmitting the response data to the online content management system.

System 200 may determine whether the response is a valid response to the challenge (908). Upon receiving verification that the response is a valid response to the challenge, system 200 may access the local content by the web browser via the client device (910). The verification may be received from the online content management system when the online content management system determines that the response data is a valid response to the challenge data. If system 200 determines that the response is not a valid response, then system 200 may deny the web browser access to the local content (912).

FIG. 10 shows yet another exemplary method embodiment. The exemplary method embodiment shown in FIG. 8 may be practiced by, for example, an online content management system external to the client device. System 200 can receive, at an online content management system from a client application on a client device, a request to issue challenge data, the client application being configured to synchronize a local content stored on the client device with a remote content stored in the online content management system, wherein the challenge data is adapted for validating a web browser on the client device for access of the local content (1002). System 200 may generate the challenge data (1004). System 200 can then transmit the challenge data to the client application (1006). System 200 may receive response data from the web browser, the response data having been created by the web browser based on the challenge data that the web browser has received from the client application (1008). System 200 may determine whether the response data is a valid response to the challenge data, to yield a validation result (1010). System 200 may transmit the validation result to at least one of the client application or the web browser (1012).

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim.

What is claimed is:

1. A method comprising:
receiving, at a local web server on a client device and from a web browser on the client device, a request to access a local content stored on the client device, wherein a client application working in conjunction with the local web server is configured to synchronize the local content with a remote content stored in an online content management system;
issuing, by the client application working with the local web server, a challenge for the web browser;
receiving a response to the challenge; and
when the response is a valid response to the challenge, allowing the web browser to access the local content via the client application working with the local web server.

2. The method of claim 1 wherein receiving the request comprises receiving, by the local web server, the request addressed to a loopback address of the client device.

3. The method of claim 1, wherein receiving the request comprises establishing a web socket connection between the local web server and the web browser.

4. The method of claim 1, wherein issuing the challenge comprises creating challenge data on the client device, and wherein receiving the response comprises receiving, by the client application, response data created by the web browser based on the challenge data.

5. The method of claim 4, wherein at least one of the challenge data or the response data comprises a cryptographic nonce.

6. The method of claim 4, wherein the challenge data is created by the client application at a location on the client device, the location being accessible only to applications that are running locally on the client device.

7. The method of claim 4, wherein issuing the challenge further comprises creating a file on the client device, the file comprising the challenge data and instructions for creating the response data based on the challenge data.

8. The method of claim 4, wherein issuing the challenge further comprises transmitting, by the local web server to the web browser, a location identifier that identifies a location of the challenge data on the client device.

9. The method of claim 4, wherein the response data is transmitted by the web browser to the client application via at least one of a JavaScript postMessage method, a hypertext markup language iframe, or a pop-up window.

10. The method of claim 1, further comprising:
prior to issuing the challenge, performing a security verification comprising one of (i) validating that the request comes from a correct local user, or (ii) validating that an address associated with the local web server resolves to a loopback address for the client device.

11. The method of claim 1, wherein data traffic between the local web server and the web browser is doubly encrypted.

12. The method of claim 1, wherein issuing the challenge comprises:
receiving challenge data from the online content management system; and
forwarding the challenge data to the web browser.

13. The method of claim 12, wherein receiving the response comprises:
receiving, from the online content management system, a validation of response data, the response data having been created by the web browser based on the challenge data and sent by the web browser to the online content management system.

14. The method of claim 1, wherein the client device is one of a desktop computer, a mobile computer, a mobile communications device, a smart television, or a set-top box.

15. A client device comprising:
a processor; and
a computer-readable medium storing instructions which, when executed by the processor, cause the processor to perform operations comprising:
transmitting, from a web browser on the client device to a local web server on the client device, a request to access a local content stored on the client device, wherein a client application works in conjunction with the local web server and is configured to synchronize the local content with a remote content stored in an online content management system;
receiving, by the web browser, a challenge from the client application working with the local web server;
transmitting, by the web browser, a response to the challenge; and
upon receiving verification that the response is a valid response to the challenge, accessing the local content by the web browser via the client application working with the local web server.

16. The client device of claim 15, wherein receiving the challenge comprises:
receiving, by the web browser, a location identifier for challenge data created by the client application at a location on the client device, the location being accessible only to applications that are locally running on the client device; and
accessing, by the web browser, the challenge data using the location identifier.

17. The client device of claim 16, wherein transmitting the response comprises:
creating response data by the web browser based on the challenge data; and
transmitting the response data by the web browser to the client application working with the local web server.

18. The client device of claim 15, wherein receiving the challenge comprises:
receiving, by the web browser, challenge data from the client application, wherein the challenge data is also sent by the client application to the online content management system.

19. The client device of claim 18, wherein transmitting the response comprises:
creating, by the web browser, response data based on the challenge data; and
transmitting the response data to the online content management system.

20. The client device of claim 19, wherein the verification is received from the online content management system when the online content management system determines that the response data is a valid response to the challenge data.

21. The client device of claim 15, wherein the client device is one of a desktop computer, a mobile computer, a mobile communications device, a smart television, or a set-top box.

22. A non-transitory computer-readable medium storing instructions which, when executed by a processor, cause the processor to perform operations comprising:
receiving, at an online content management system from a local web server on a client device, a request to issue challenge data, wherein the local web server is configured to work with a client application to synchronize a local content stored on the client device with a remote content stored in the online content management system, wherein the challenge data is adapted for validating a web browser on the client device for access of the local content;

generating the challenge data;

transmitting the challenge data to the web browser;

receiving response data from the web browser, the response data having been created by the web browser based on the challenge data that the web browser has received from the online content management system;

determining whether the response data is a valid response to the challenge data, to yield a validation result; and transmitting the validation result to at least one of the client application or the web browser.

23. The non-transitory computer-readable medium of claim 22, wherein the client device is one of a desktop computer, a mobile computer, a mobile communications device, a smart television, or a set-top box.

* * * * *